(12) United States Patent
Abe et al.

(10) Patent No.: US 6,995,786 B2
(45) Date of Patent: Feb. 7, 2006

(54) ELECTRONIC ENDOSCOPE FORMING STILL IMAGE BY DOUBLE-SPEED READING

(75) Inventors: Kazunori Abe, Saitama (JP); Fujio Okada, Saitama (JP)

(73) Assignee: Fujinon Corporation, Saitama (JP)

( * ) Notice: Subject to any disclaimer, the term of this patent is extended or adjusted under 35 U.S.C. 154(b) by 672 days.

(21) Appl. No.: 10/237,952

(22) Filed: Sep. 10, 2002

(65) Prior Publication Data

US 2003/0058336 A1   Mar. 27, 2003

(30) Foreign Application Priority Data

Sep. 25, 2001  (JP)  ............... 2001-290538

(51) Int. Cl.
 *H04N 7/18*  (2006.01)
 *H04N 9/47*  (2006.01)
 *A62B 1/04*  (2006.01)

(52) U.S. Cl. ...................................... 348/65
(58) Field of Classification Search .................. 348/65; 600/101, 109; A62B 1/04; H04N 7/18, H04N 9/47

See application file for complete search history.

(56) References Cited

U.S. PATENT DOCUMENTS

| | | | | |
|---|---|---|---|---|
| 5,206,730 A | * | 4/1993 | Sakai | 348/220.1 |
| 6,314,248 B1 | * | 11/2001 | Ohmura et al. | 396/429 |
| 6,377,301 B1 | * | 4/2002 | Hieda | 348/231.99 |
| 6,791,623 B1 | * | 9/2004 | Masuda et al. | 348/563 |
| 6,836,293 B2 | * | 12/2004 | Itoh et al. | 348/452 |

FOREIGN PATENT DOCUMENTS

JP   09-080322   3/1997

* cited by examiner

*Primary Examiner*—Nhon Diep
(74) *Attorney, Agent, or Firm*—Snider & Associates; Ronald R. Snider

(57) ABSTRACT

To provide a timing generator which generates a first reference signal at a standard speed of approximately 14 MHz and a second reference signal operating at approximately 28 MHz which is double the standard speed and forms a moving image based on the first reference signal, reads, when a freeze switch is operated, an image pickup signal based on the second reference signal operating at the double speed and writes this signal into the memory 36 at the same speed. Then, by reading this still image signal from the memory at the standard speed, the still image is displayed on the monitor. Thereby, the need for setting a conventional light shielding period can be eliminated.

1 Claim, 5 Drawing Sheets

ELECTRONIC ENDOSCOPE FORMING STILL IMAGE BY DOUBLE-SPEED READING

BACKGROUND OF THE INVENTION

This application claims the priority of Japanese Patent Application No. 2001-290538 filed on Sep. 25, 2001 which is incorporated herein by reference.

1. Field of the Invention

The present invention relates to an electronic endoscope, and more particularly, to signal processing control of an electronic endoscope which reads signals of all pixels of a still image obtained by exposure within a 1 vertical scanning period and forms a 1-frame image.

2. Description of the Related Art

In an electronic endoscope, light from a light source lamp is guided through a light guide to a tip of a scope and the light is irradiated from this scope tip onto an object under observation and an image of this object is taken by an image pickup element such as a CCD (Charge Coupled Device) via an objective optical system. This CCD reads signals (charges) stored every 1-field period one by one and forms moving images. On the other hand, when a still image is formed, the CCD reads signals of all pixels obtained by exposure for a 1 vertical scanning period using a light shielding period in order to reduce influences of motions of the object under observation. A conventional example of the technology for reading signals of all pixels is disclosed in, for example, Japanese Patent Laid-Open No. 9-80322.

FIG. 6 shows an internal configuration of a conventional light source apparatus and this apparatus is provided with a light quantity adjuster 3 in front of a lamp 2 which is turned on by a lighting circuit 1, a light shielding shutter 4 that shields the light from the lamp 2 and a condensing lens 5, and the light from this condensing lens 5 is supplied to an incident end of a light guide 6. There is also a shutter drive circuit (including a motor) 7 that drives the light shielding shutter 4 and this shutter drive circuit 7 shields the light from the lamp for a 1 vertical scanning period, for example, by driving and turning the shutter 4.

FIG. 7 shows the light (exposure) output through the light guide 6 and the reading of a signal from the CCD. For example, a vertical sync signal for a ⅟60 sec period shown at a top of FIG. 7 is used. Then, as shown in a middle of FIG. 7, control is performed in such a way that periods $L_1$, $L_2$, . . . during which light is output and a light shielding period C are alternated for every 1 vertical scanning period, and as shown at the bottom of FIG. 7, odd lines 1, 3, 5, . . . of pixel signals (charges) stored in the CCD for the light output period $L_1$ are read in the next period (light shielding period C) and even lines 2, 4, 6, . . . are read in the period after the next period. That is, the light shielding period C is provided to eliminate stored charges in the CCD and allow signals on the even lines to be read.

The signals on the odd lines read from the CCD in this way are processed as odd field signals, while the signals on the even lines are processed as even field signals and it is possible to form moving images or still images by using these field signals. Furthermore, this all pixel reading system can only be executed when the still image is formed, and according to this system, an image is formed by all pixel signals obtained by exposure within 1 vertical scanning period of ⅟60 sec, providing an advantage of obtaining a clear image which is not affected by motions of an object under observation, etc.

However, the conventional electronic endoscope needs to include the light shielding shutter 4 to shield light of the lamp 2 and the shutter drive circuit 7 including a motor to drive this shutter 4 as shown in FIG. 6 to create the above-described light shielding period, which involves a problem of complicating the configuration. Furthermore, because of the need to completely shield light in an effective period except a blanking period within 1 vertical scanning period, the conventional electronic endoscope must speedily perform operations of starting driving and stopping the light shielding shutter, which causes inconvenience such as complicating drive control and complicating the drive circuit itself.

SUMMARY OF THE INVENTION

The present invention has been achieved in view of the problems described above and it is an object of the present invention to provide an electronic endoscope capable of reading all pixel signals for a still image without providing any light shielding period and eliminating the light shielding shutter and its drive circuit which would complicate the configuration.

In order to attain the above-described object, the present invention provides an electronic endoscope that captures an image of an illuminated object under observation by using an image pickup element and performs image processing for displaying a moving image or still image, including a timing generator that generates a first reference signal at a standard speed and a second reference signal at a speed doubling the speed of this first reference signal or faster, an image pickup element drive circuit that reads a signal for forming a moving image from the image pickup element based on the first reference signal at the standard speed and reads an all pixel signals obtained by exposure within a 1 vertical scanning period to form a still image based on the second reference signal at a speed doubling the standard speed of faster, a memory to store the still image signal obtained by the image pickup element and a control circuit that performs control so that the still image signal is written into this memory at a speed doubling the speed of the standard speed or faster and then this still image signal is read at the standard speed.

According to the above-described configuration, the image pickup signal is read based on the first reference signal (clock signal) at a standard speed of, for example, approximately 14 MHz, and a moving image is formed in this way. When a still image switch is operated, the image pickup signal is read based on the second reference signal (clock signal) at a double-speed of approximately 28 MHz, this signal is subjected to image processing and then written into memory at the same speed. Then, the still image signal in this memory is read at the standard speed of approximately 14 MHz, subjected to the same processing as for a moving image to form a still image. The double-speed processing of this still image signal makes it possible to read all pixel signals to form odd and even fields within 1 vertical scanning period, which eliminates the need for a light shielding period which would be set in the conventional art.

DETAILED DESCRIPTION OF THE PREFERRED EMBODIMENTS

Figure 1:
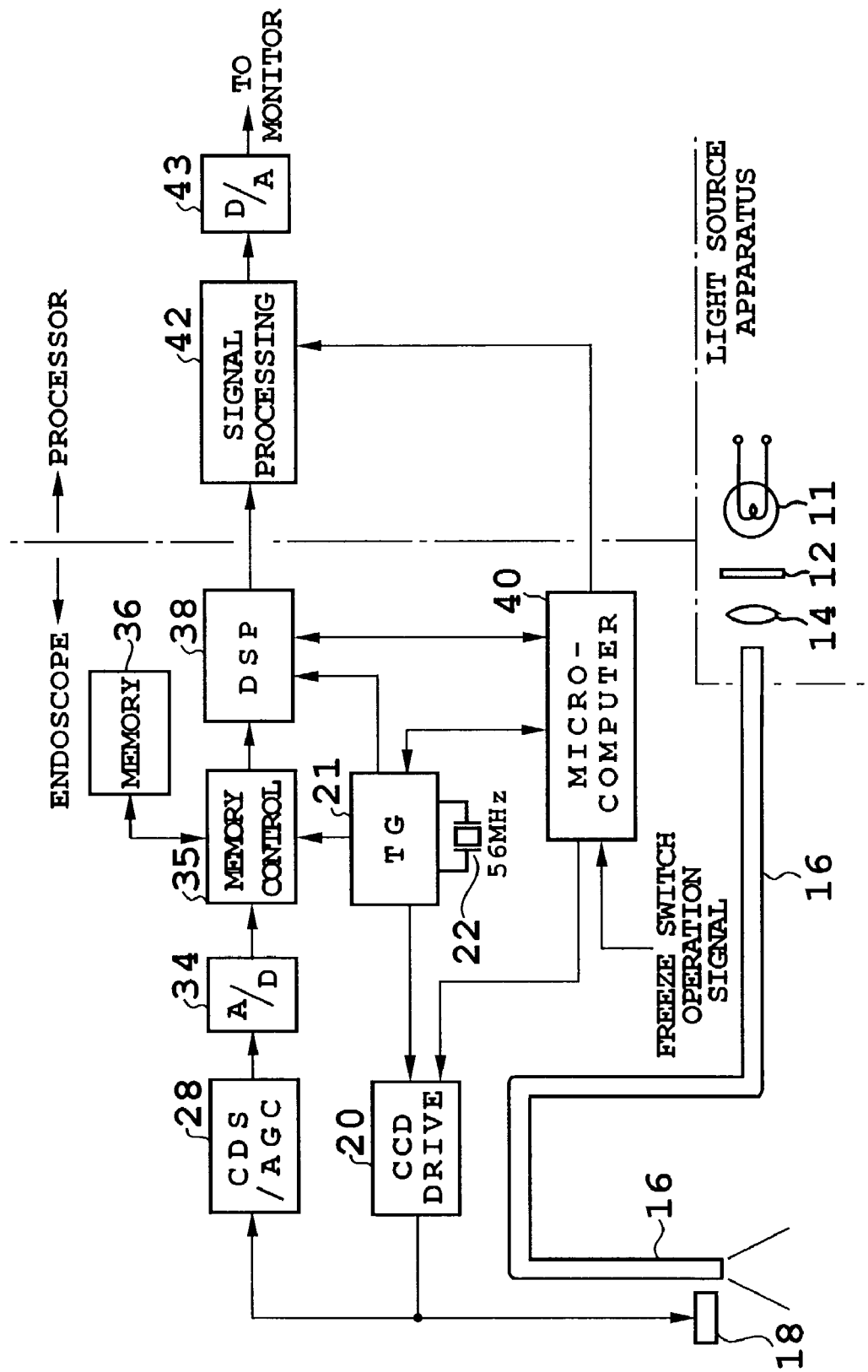
FIG. 1 is a block diagram showing a main configuration of an electronic endoscope according to an embodiment of the present invention.
Figure 2:
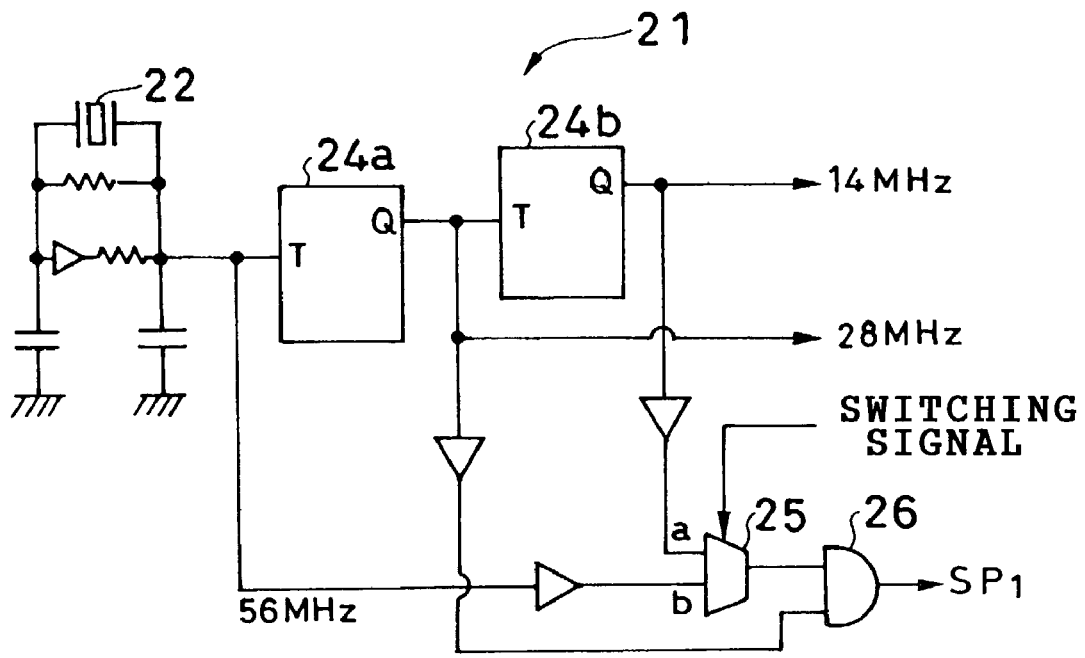
FIG. 2 is a circuit diagram showing a configuration of part of an inside of a timing generator of the embodiment.
Figure 3:
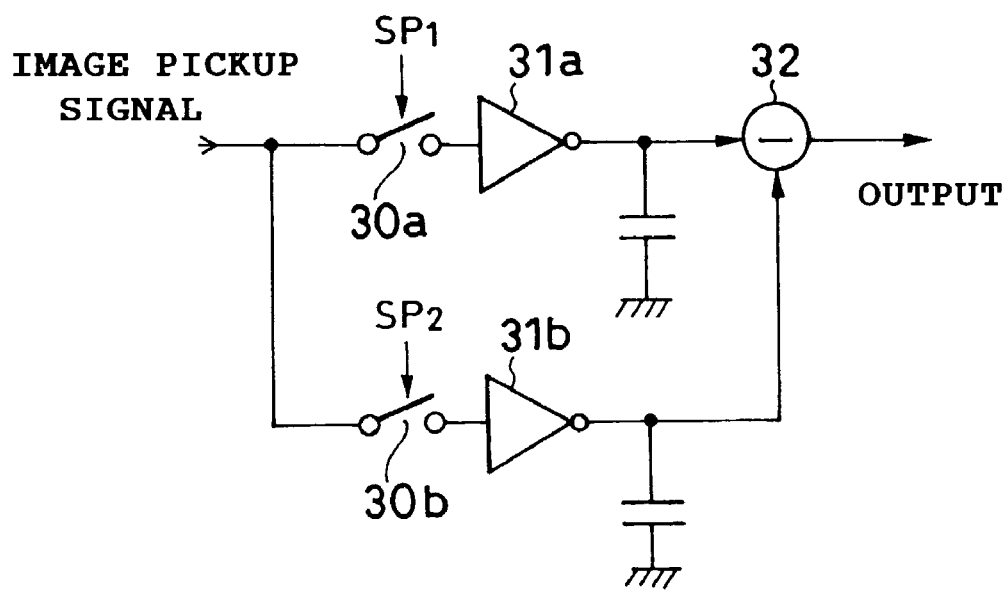
FIG. 3 is a circuit diagram showing a configuration of part concerning sampling at a CDS/AGC circuit of the embodiment.

FIG. 1 to FIG. 3 show a configuration of an electronic endoscope according to an embodiment of the present invention and this electronic endoscope is provided with a scope, a processor apparatus and a light source apparatus, etc. In this FIG. 1, the light source apparatus is provided with a lamp 11 such as xenon lamp, a light quantity adjuster 12, a condensing lens 14 and light from this condensing lens 14 is supplied to a light guide 16. As shown in the drawing, there is neither light shielding plate nor light shielding plate drive circuit to shield light from the lamp 11.

The above described light guide 16 extends from the light source apparatus to the tip of the scope and a CCD (image pickup element) 18 to capture an image of an object under observation is provided at the tip of this scope via an objective optical system. This CCD 18 is connected to a CCD drive circuit 20 that outputs a sweeping pulse (SUB pulse), a reading pulse and a horizontal transfer pulse, etc. to read stored charges and this CCD drive circuit 20 is connected to a timing generator (TG) 21.

FIG. 2 shows an internal configuration of the timing generator 21 and this timing generator 21 is provided with an oscillator 22 that generates a frequency of approximately 56 MHz, a first frequency divider 24a that divides this signal with a frequency of 56 MHz to generate a second reference signal (clock signal) at a double speed of approximately 28 MHz, a second frequency divider 24b that divides the second reference signal to generate a first reference signal (clock signal) at a standard speed of approximately 14 MHz, a switch 25 that switches between the 14 MHz signal output from this second frequency divider 24b (terminal a) and the 56 MHz signal output from the oscillator 22 (terminal b) and an AND circuit 26 that carries out the logical AND between the output of this switch 25 and the output of the first frequency divider 24a.

According to this timing generator 21, the second reference signal at the double-speed is output from the first frequency divider 24a, the first reference signal at the standard speed is output from the second frequency divider 24b, and when the switch 25 is set to the terminal a, a sampling pulse $SP_1$ at the standard speed is obtained and when the switch 25 is set to the terminal b, a sampling pulse $SP_1$ at the double-speed is obtained. Though not shown, various other timing signals including a sampling pulse $SP_2$ to eliminate noise during sampling are formed.

On the other hand, a CDS (Correlated Double Sampling)/AGC (Automatic Gain Control) 28 are provided after the above described CCD 18 and this CDS/AGC 28 applies correlated double sampling to the output signal of the CCD 18 by using the sampling pulses $SP_1$ and $SP_2$ and performs predetermined amplification processing as well.

FIG. 3 shows part of the sampling circuit of this CDS/AGC 28, which is provided, as shown in the drawing, with a circuit 30a (expressed as a switch here) to give the sampling pulse $SP_1$ and extract an image pickup signal, a circuit 30b to give the sampling pulse $SP_2$ and extract a noise signal at a reference level, inversion elements 31a and 31b and a difference output device 32. That is, an image information section of the image pickup signal is extracted by the pulse $SP_1$ and on the other hand, a noise component at a reference level of the image pickup signal is extracted by the pulse $SP_2$ and the difference output device 32 can subtract and eliminate the noise component from the image information section.

Such a CDS/AGC 28 is connected through the A/D converter 34 to a memory control circuit 35 and memory 36, and this memory control circuit 35 performs control so that a moving image signal is output directly without passing through the memory 36 and the still image signal is written into the memory 36 at a double-speed of 28 MHz (speed in pixel units) and then read at a standard speed of 14 MHz. After this memory control circuit 35 there is provided a DSP (Digital Signal Processor) 38 and this DSP 38 applies various kinds of processing such as white balance, gamma correction, etc. and forms a brightness signal and color-difference signal, for example.

Furthermore, a microcomputer 40 that performs various kinds of overall control over the above-described circuits is provided and this microcomputer 40 is supplied with a signal for operating a freeze switch provided for the scope operation section, etc. and the microcomputer 40 controls formation of still images by using this. Furthermore, the processor apparatus is provided with a signal processing circuit 42 to input an image signal output from the DSP 38 and a D/A converter 43 and the signal processing circuit 42 performs various kinds of processing to output the image signal to the monitor.

Figure 4:
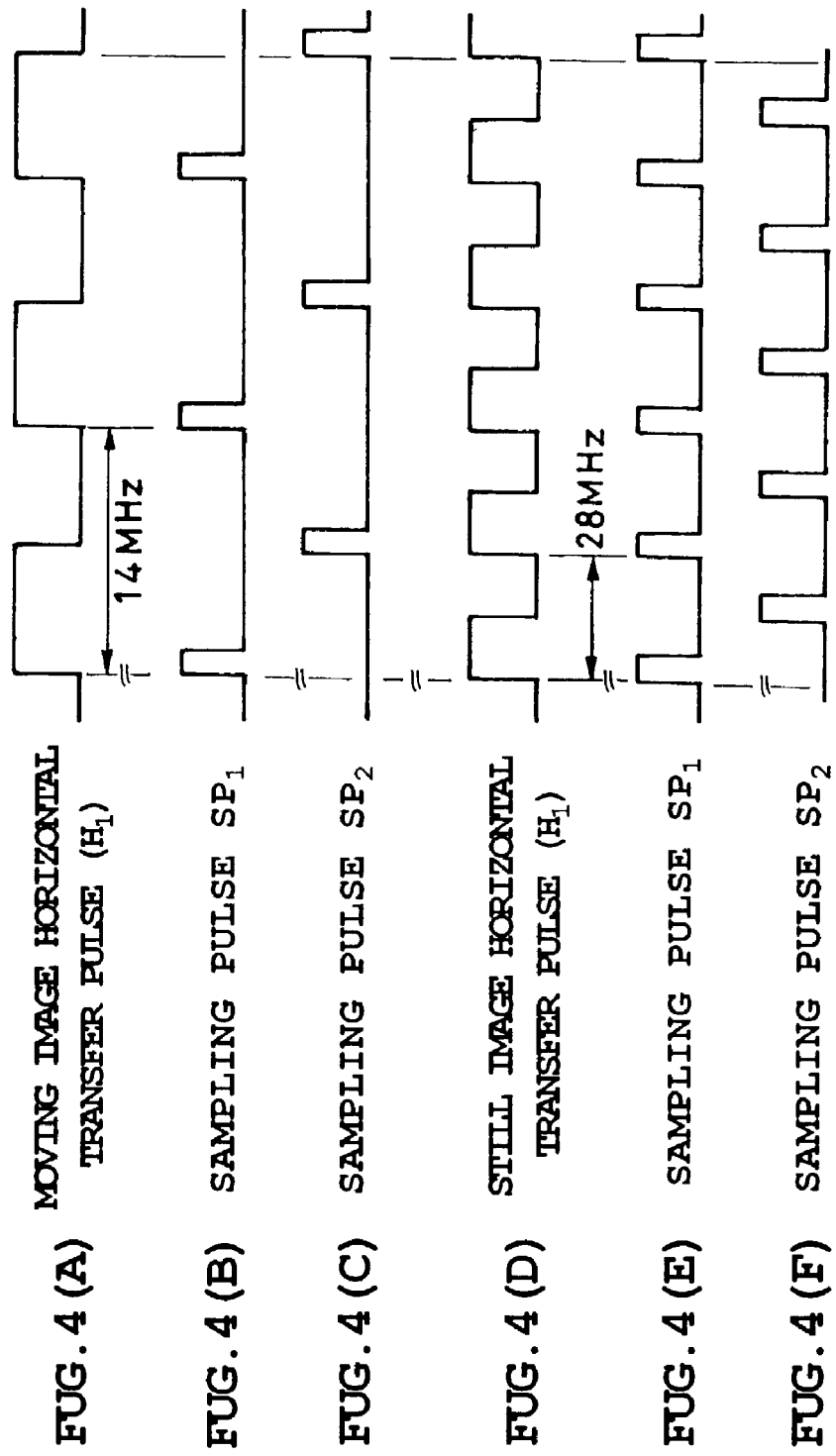
FIG. 4(A) to FIG. 4(F) are waveform charts showing signals generated by a CCD drive circuit and a timing generator of the embodiment.
Figure 5:
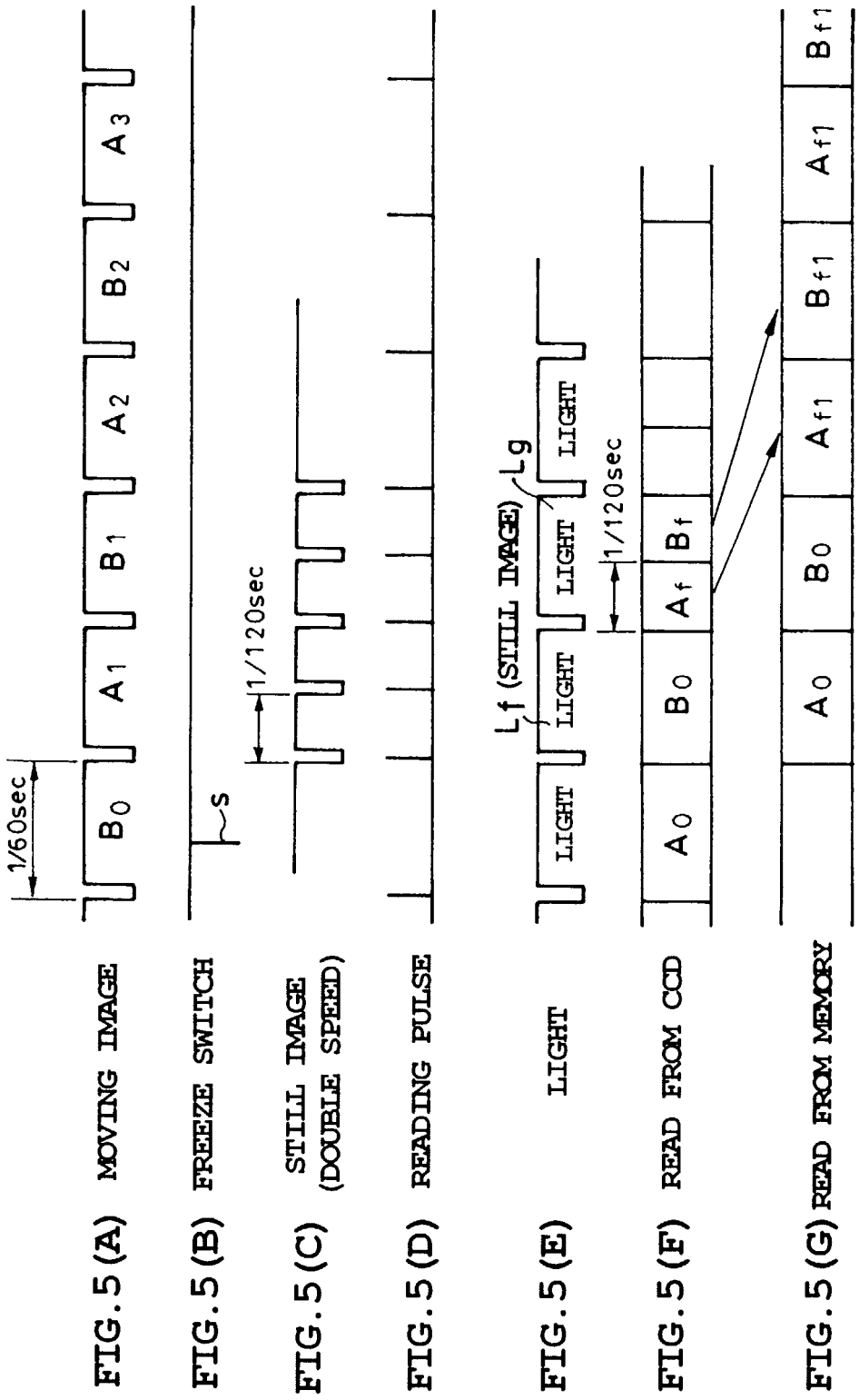
FIGS. 5(A) to 5(G) illustrate signals and operations concerning image formation of the embodiment.
Figure 6:
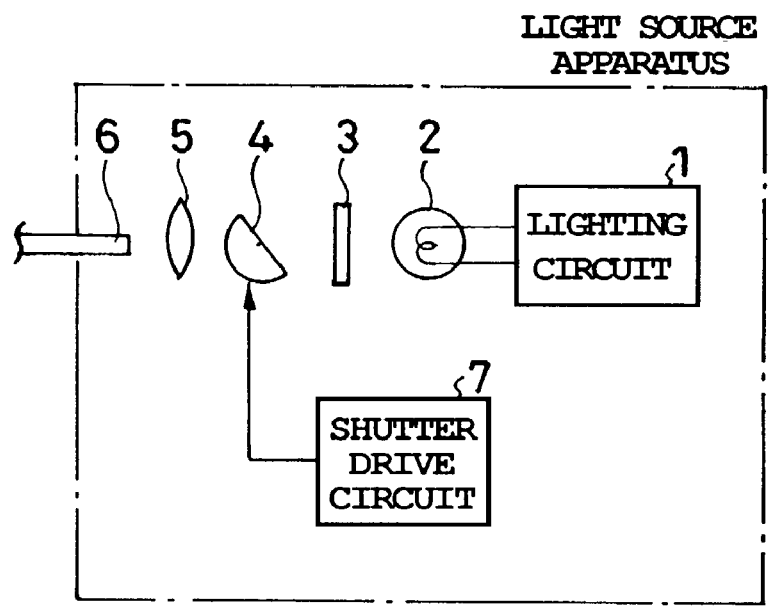
FIG. 6 illustrates a configuration of a conventional light source apparatus.

The embodiment has a configuration as shown above and its operation will be explained with reference to FIG. 4 and FIG. 5. FIG. 4(A) to FIG. 4(F) show signals output from the CCD drive circuit 20 and the timing generator 21. When a moving image is formed, the 14 MHz horizontal transfer pulse ($H_1$) at a standard speed in FIG. 4(A) is given from the CCD drive circuit 20 to the CCD 18 and the sampling pulses $SP_1$ and $SP_2$ at a standard speed in FIGS. 4(B) and 4(C) are given from the timing generator 21 to the CDS/AGC circuit 28. Furthermore, when a still image is formed, the horizontal transfer pulse ($H_1$) at a 28 MHz double-speed in FIG. 4(D) is given to the CCD 18 and the sampling pulses $SP_1$ and $SP_2$ at a double-speed in FIGS. 4(E) and 4(F) are given to the CDS/AGC circuit 28.

FIGS. 5(A) to 5(G) illustrate operations of the various sections when an image is formed, and when a normal moving image is formed, odd and even field signals $A_1$, $B_1$, $A_2$, $B_2$, ... are obtained every vertical scanning period of 1/60 sec as shown in FIG. 5(A). That is, signals stored in the CCD 18 are extracted on a pixel-by-pixel basis by the frequency 14 MHz horizontal transfer pulse ($H_1$) in FIG. 4(A) and an image signal is extracted by the standard speed sampling pulses $SP_1$ and $SP_2$ in FIGS. 4(B) and 4(C), and through this processing odd and even field signals are formed every 1 vertical scanning period. By supplying these field signals to the monitor through other circuits, a moving image of the object under observation is formed on the monitor.

On the other hand, when the freeze switch is operated, a freeze signal s in FIG. 5(B) is supplied to the microcomputer 40, a vertical sync signal with a 1/120 sec period in FIG. 5(C) and a read pulse, etc. in FIG. 5(D) are given to the CCD 18.

This CCD 18 reads the charges (signals) of all pixels stored by one-time exposure $L_f$ of the received light shown in FIG. 5(E) as a still image signal. That is, the signal is read on a pixel-by-pixel basis by the horizontal transfer pulse ($H_1$) with a frequency of 28 MHz in FIG. 4D which doubles the normal speed and in this way an odd horizontal line signal $A_f$ and even horizontal line signal $B_f$ are extracted every $\frac{1}{120}$ sec period as shown in FIG. 5(F).

Furthermore, at the above described CDS/AGC circuit 28, an image signal is extracted by the double-speed sampling pulses $SP_1$ and $SP_2$ in FIGS. 4(E) and 4(F), subjected to other processing and in this way field-signals $A_{f1}$ and $B_{f2}$ are formed. Then, these still image field signals $A_{f1}$ and $B_{f2}$ are written into the memory 36 at a double-speed, that is, at a speed corresponding to 1 vertical scanning period of $\frac{1}{120}$ sec. Then, as shown in FIG. 5(G), the odd and even field signals $A_{f1}$ and $B_{f2}$ are read from the memory 36 at a standard speed, that is at a speed corresponding to 1 vertical scanning period of $\frac{1}{60}$ sec. By the way, these field signals $A_{f1}$ and $B_{f2}$ are read repeatedly until the still image formation operation is completed. Then, the odd and even field signals $A_{f1}$ and $B_{f2}$ of the still image are output through the DSP 38, signal processing circuit 42 to the monitor and as a result, a still image is displayed on the monitor.

Figure 7:
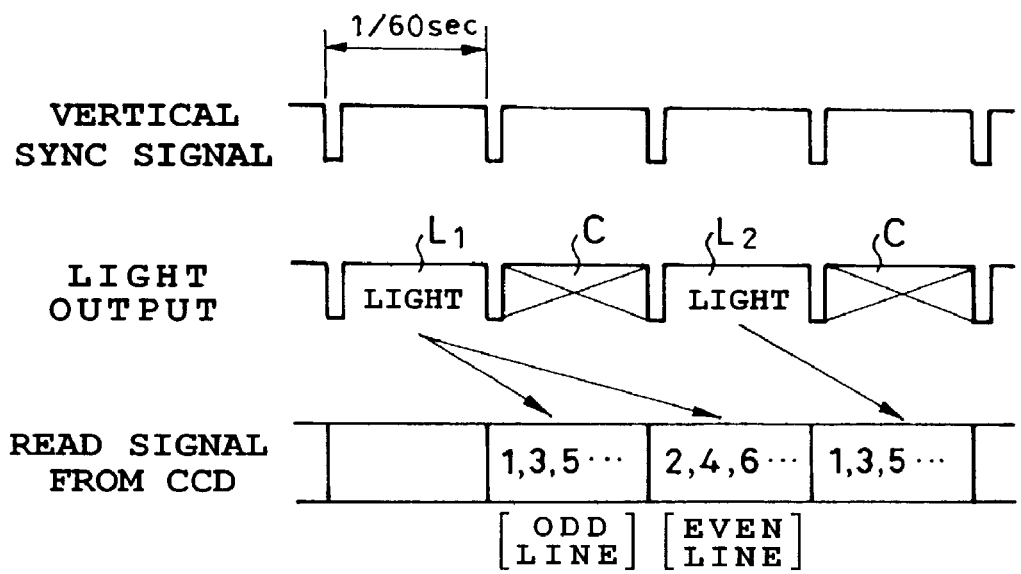
FIG. 7 illustrates an operation of a conventional image pickup element.

In such a still image, 1-frame image information is formed in $\frac{1}{60}$ sec requiring an exposure time half that of a moving image of $\frac{1}{30}$ sec, which gives a clear image free of influences of motions of the object under observation, etc. Furthermore, by reading image pickup signals of all pixels from the CCD 18 at a double-speed (or faster than double-speed), there is no need to set the next period [period Lg in FIG. 5(E)] as a light shielding period as in the case of the conventional art in FIG. 7, which constitutes an advantage of eliminating the need for a light shielding shutter and a drive circuit thereof.

As explained above, the present invention includes a timing generator that generates a first reference signal at a standard speed and a second reference signal at a speed doubling the standard speed or faster and controls so that all pixel signals captured by an image pickup element are read at a double-speed or faster when a still image is formed, still image signals of all these pixel signals are stored in memory at the double speed and then read at the standard speed, thus making it possible to read all pixel signals for the still image without providing any light shielding period. Therefore, there is no need to provide any light shielding shutter and a drive circuit thereof or complicated drive control for this light shielding shutter.

What is claimed is:

1. An electronic endoscope comprising:
   an image pickup element that captures an image of an illuminated object under observation;
   a circuit that carries out image processing for displaying a moving image or a still image;
   a timing generator that generates a first reference signal at a standard speed and a second reference signal at a speed doubling the speed of this first reference signal or faster;
   an image pickup element drive circuit that reads a signal for forming a moving image from said image pickup element based on said first reference signal at the standard speed and reads all pixel signals obtained by exposure within a 1 vertical scanning period to form a still image based on said second reference signal at a speed doubling the speed of the standard speed or faster;
   a memory to store the still image signal obtained by said image pickup element; and
   a control circuit that performs control so that said still image signal is written into this memory at a speed doubling the speed of the standard speed or faster and then this still image signal is read at the standard speed.

* * * * *